United States Patent
Schumacher et al.

(10) Patent No.: US 12,269,406 B2
(45) Date of Patent: Apr. 8, 2025

(54) METHOD FOR OPERATING A VEHICLE ELECTRICAL SYSTEM

(71) Applicant: Robert Bosch GmbH, Stuttgart (DE)

(72) Inventors: Hartmut Schumacher, Freiberg (DE); Roman Vasylenko, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 189 days.

(21) Appl. No.: 18/308,075

(22) Filed: Apr. 27, 2023

(65) Prior Publication Data

US 2023/0365086 A1    Nov. 16, 2023

(30) Foreign Application Priority Data

May 11, 2022  (DE) ...................... 10 2022 204 587.4

(51) Int. Cl.
*B60R 21/017*   (2006.01)
*B60R 16/03*    (2006.01)
*H02J 7/00*     (2006.01)
*B60R 21/01*    (2006.01)

(52) U.S. Cl.
CPC ............ *B60R 21/017* (2013.01); *B60R 16/03* (2013.01); *H02J 7/0047* (2013.01); *B60R 2021/01163* (2013.01); *H02J 2207/20* (2020.01)

(58) Field of Classification Search
CPC ....... B60R 21/017; B60R 16/03; B60R 21/01; B60R 2021/01122; B60R 2021/01129; B60R 2021/01136; B60R 2021/01143; B60R 2021/0115; B60R 2021/01156; B60R 2021/01163; H02J 7/0047; H02J 2207/20

See application file for complete search history.

(56) References Cited

U.S. PATENT DOCUMENTS

| 2003/0226704 | A1* | 12/2003 | Aoki ....................... B60R 22/44 180/271 |
| 2018/0029554 | A1* | 2/2018 | Schumacher ...... G01R 31/2879 |

FOREIGN PATENT DOCUMENTS

| DE | 3920713 A1 | 1/1991 |
| DE | 102015201260 A1 | 7/2016 |
| DE | 102018132203 A1 | 6/2020 |

\* cited by examiner

*Primary Examiner* — Jacob M Amick
(74) *Attorney, Agent, or Firm* — NORTON ROSE FULBRIGHT US LLP; Gerard A. Messina

(57) ABSTRACT

A method for operating a vehicle electrical system that is provided for supplying at least one restraint system. In the method, in addition to monitoring the vehicle electrical system voltage, at least one further indicator is monitored as an indicator. A critical supply state of the restraint system is detected by evaluating these indicators and the efficiency of the used DC voltage switching converters is reduced by at least one measure, so that a supply current for at least one restraint system is reduced by the at least one restraint system. A release condition is requested prior to implementing the at least one measure.

12 Claims, 2 Drawing Sheets

METHOD FOR OPERATING A VEHICLE ELECTRICAL SYSTEM

CROSS REFERENCE

The present application claims the benefit under 35 U.S.C. § 119 of German Patent Application No. DE 10 2022 204 587.4 filed on May 11, 2022, which is expressly incorporated herein by reference in its entirety.

FIELD

The present invention relates to a method for operating a vehicle electrical system and an arrangement for carrying out the method.

BACKGROUND INFORMATION

In automotive use, a vehicle electrical system, which can also be referred to as a power supply system, is understood to mean the entirety of all electrical components in a motor vehicle. This thus includes both electrical consumers and energy or supply sources, such as batteries for example. In a motor vehicle, care must be taken to ensure that electrical power is available in such a way that the motor vehicle can be started at any time, and that there is an adequate power supply during operation. But even when the vehicle is parked, electrical consumers should still be operable for a reasonable period of time without a subsequent start being impaired.

The vehicle electrical system in a motor vehicle is typically also provided or configured to control or power restraint systems. Restraint systems are passive safety devices in a vehicle that are intended, among other things, to optimally secure vehicle occupants in their seats when necessary, for instance in the event of a collision, to appropriately stop displacements, for example of the head, etc. The intent is to thus reduce the consequences of an accident for the occupants.

Restraint systems are in particular intended to protect the occupants from colliding with components of the vehicle structure or other occupants. Examples of restraint systems are seatbelts and airbags.

The hitherto used restraint systems generally cover the required supply voltage and temperature range reliably. However, in particular in the event of faulty states of the vehicle supply system, excessively high current loads on the supply and the restraint system can occur, which further worsens the supply situation and increases the temperature load on the electronics.

In particular in the case of defects, such as a too low supply voltage, a too small current carrying capacity of the supply and/or too high internal resistances of the supply of the vehicle supply system, this can endanger the function of the restraint system due to the vehicle falling below a minimum guaranteed supply voltage and critical temperatures of the restraint system electronics, e.g., the system base chip/system ASIC, being exceeded.

In this context, it should be noted:

Restraint systems have to ensure function over a wide voltage range, e.g. in a range from 6 V to 27 V, with restricted temperatures and exposure durations for extreme values and extreme ranges. In the voltage range from 10 V to 16.5 V, there is typically no restriction on the temperature profile and the service life. In order to enable the system to function in the wide voltage range stated above, including a measurement tolerance, restraint systems are equipped with boost converters or step-up converters. This makes it possible to charge the energy stores commonly used in restraint systems to as much as 25 V to 40 V for a self-sufficient supply, and at the same time meet the supply requirements of the electronics or sensor system in the case of supply and in the case of self-sufficiency via highly efficient buck converters or step-down converters. Switching converters with a frequency from 1.875 MHz to 2.3 MHz are typically used for this purpose. Even higher frequencies will be taken into account in the future.

If, for example, a system supply current of 280 mA has to be provided for the full function of the restraint system, in particular during startup for a typical system with a 33 V output voltage of the boost converter, an input current of 0,748 A is required for a supply voltage $U_B$ of 14.5 V, i.e., the engine is running, and an internal control unit voltage drop, caused by supply filters and reverse polarity protection measures, of maximum $V_{drop}=1V$. This applies for an assumed boost converter efficiency of 91.5%.

At the given system requirements, such as a power of the system $P_{system}$ of 9.24 W, for instance, and given fixed components, such as switching transistors, converter coil, freewheeling diode, with fixed operating parameters, such as temperature, switching frequency, transistor switching times, the efficiency of the boost converter depends substantially on the input voltage VZP of the boost converter.

For $U_B$=14.5 V, VZP=$U_B$-$V_{drop}$=13.5 V, f=2.3 MHz, tr=10 ns, tf=10 ns and an output power $P_{output}$=$P_{system}$=9.24 W, a boost converter efficiency ηboost@13.5V can be 91.5%, for instance.

In particular at small input voltages, the efficiency drops sharply. The proportion of the charging phase of the boost converter switching transistor in the fixed cycle time=1/f is especially large here. This results in high losses.

Because the efficiency of the boost converter drops as the input voltage decreases, the input current has to increase disproportionately in order to provide the required output power $P_{system}$. Even if the design of the boost converter as an integrated function of the system base chip allows this, the restraint system requires disproportionately more input current as the supply voltages decrease.

Assuming a fixed efficiency ηboost@xV of 91.5% independent of the input voltage of the boost converter, the optimally to be expected input current values IB of the restraint system are obtained for smaller input voltages, for instance of UB=6V/5.5V.

In reality, however, due to the $U_B$, $U_{in}$=VZP dependence on ηboost, the restraint system accordingly requires a disproportionately higher supply current from the vehicle supply system in order to be able to provide the required system power $P_{system}$. If the continued decrease of $U_B$ is only slight, a drastically higher supply current is immediately required.

Thus, measures are sought to counteract a drop in the efficiency of the system supply converters. These measures in particular include reducing the converter switching times tr and tf or the converter frequency, i.e., the cycle time.

If the converter switching time in the above example is suitably reduced from tr, tf=10 ns to 5 ns, for instance, the efficiency of the otherwise unchanged boost converter ηboost@5V increases from 69.2% to 78.5% and ηboost@4.5V increase from 61.9% to 73.5%.

If the converter frequency is suitably reduced, for instance, from f=2.3 MHz to f=1.875 MHz, the efficiency of the otherwise unchanged boost converter ηboost@5V increases from 69.2% to 72.7% and ηboost@4.5V increases from 61.9% to 66.4%.

If both measures are taken, the efficiency of the otherwise unchanged boost converter ηboost@5V increases from 69.2% to 80.1% and ηboost@4.5V increases from 61.9% to 75.5%.

These measures have side effects that have to be considered for the respective restraint system and are dependent on the system criteria which are referred to here as sufficient conditions, e.g., which current-reducing measures should be taken and how pronounced they are, which indicators, referred to here as necessary conditions, should be used for evaluation and which values of the indicators lead to a justified response in order to reliably ensure the availability of the life-saving electronic restraint system. The indicators that characterize a critical supply state of the restraint system as necessary conditions have to be selected appropriately for the respective vehicle electrical system and the restraint system and the evaluation and response function has to be specified appropriately for the respective system. These are referred to here as sufficient conditions:

For example, in the simplest case, a first and second indicator are selected as a necessary condition, e.g. a restraint system supply voltage $U_B$ and the vehicle outside temperature.

In the simplest case, the evaluation function can represent a combination of threshold information. If $U_B$ falls below the threshold of 7.5 V and the vehicle outside temperature exceeds a temperature of 45° C., the times tr, tf of all switching converters of the restraint system electronics, for example, are reduced, for example in one step, from 7 ns to 10 ns to 5 ns, for instance. If $U_B$ falls below a value of 6.5 V, for example, and the vehicle outside temperature exceeds 50° C., for example, the switching converter frequency, for example of all converters is reduced from 2.3 MHz to 1.85 MHz, for instance.

SUMMARY

In light of this, a method and an arrangement for operating a vehicle electrical system are presented. Example embodiments of the present invention are disclosed herein.

The method presented is used to operate a vehicle electrical system that is provided for supplying at least one restraint system. According to an example embodiment of the present invention, in the method, the efficiency of used DC voltage switching converters can be increased by at least one measure via the vehicle electrical system voltage or the restraint system supply voltage and other additional indicators, which are referred to here as necessary conditions and which characterize a critical supply state of the vehicle electrical system and thus of the restraint system, so that a supply current for at least one restraint system is reduced by the at least one restraint system, wherein, using suitable system criteria, which are referred to here as sufficient conditions, the intervention and the scope of the at least one measure, a general response function, is linked to an evaluation, general evaluation function or functions, of the selected indicators vehicle electrical system voltage or restraint system supply voltage, etc., i.e., system criteria referred to here as sufficient conditions.

Operating a vehicle electrical system is understood here in particular to mean that the vehicle electrical system is operated in such a way that reliable operation of the restraint system or systems is ensured.

Suitable system criteria, referred to here as a sufficient condition or conditions, are understood, firstly, to mean a suitable selection of system indicators, referred to here as a necessary condition, that characterize a critical vehicle electrical system or restraint system supply state, secondly, an evaluation function or functions of these system indicators and, thirdly, a response function or functions that carries out current-reducing measures, in particular efficiency improvements, in the restraint system electronics, specifically individually or staggered, switchably or functionally, with precise knowledge of the side effects, such as increased electromagnetic compatibility (EMC).

Thus, a method according to an example embodiment of the present invention is provided, which supports the supply concept in critical states with reasonable effort in such a way that system availability is optimum, in particular when the engine is not running, when the generator fails, etc., during start-up or generally when the vehicle electrical system voltage is low as a result of a variety of known causes of errors for a specific type of vehicle.

This should be possible without electrically and/or thermally overloading the restraint system supply electronics while maintaining required system startup times, in particular by reducing the self-induced voltage reduction via the sharply increasing supply current when the vehicle electrical system is bad. This means a small open-circuit voltage and a high internal resistance.

Provision is made here to reduce the restraint system supply current, in particular by increasing the efficiency of the switching converters used in the restraint system electronics. This leads, on the one hand, to controlling the thermal load on the electronics and, on the other hand, to reducing the feedback effect that results from the voltage drop in the vehicle supply proportional to the load current.

A critical vehicle electrical system/restraint system supply situation in the vehicle occurs, for instance, in the event of battery cell short circuiting, a deeply discharged vehicle starter battery, high current drain by other vehicle systems in combination with an increased internal resistance of the vehicle electrical system supply, etc., and is in particular additionally amplified if these effects occur atypically at a high vehicle ambient temperature.

in principle, the restraint system electronics are already well set up due to the specified wide functional voltage range and the high thermal robustness. However, there is a need for improvement when several critical conditions come together.

There is therefore a need to test suitable system indicators as necessary conditions to ensure that the restraint system remains available, e.g., in the radio setting, when the ignition is on or the engine is starting up, when the restraint system reaches physical limits as a result of detectable vehicle electrical system/restraint system voltage supply problems/failures and other indicators.

Other suitable system indicators as necessary conditions in addition to the supply voltage $U_B$ for the criticality assessment of the vehicle electrical system/restraint system supply for initiating measures to reduce the supply current include the following:

- extremely high junction temperatures of the individual integrated switching converter transistors of the system base chip(s) of the restraint system electronics, and/or

- an extremely high chip temperature of the system base chip(s) comprising the switching converters of the refractory system supply, and/or

- a central sensor temperature of the restraint system control unit (this corresponds approximately to the control unit inner housing temperature) that is above a limit value, and/or
a temperature in the passenger compartment that is above the limit value,
and/or
a temperature in the vehicle exterior that is above the limit value,
and/or
a too high supply internal resistance of the restraint system electronics,
and/or
other information about effective defects in the supply system of the vehicle accessible to the restraint system, e.g. via a battery management.

Since the focus here is not on combating an internal error in the restraint system electronics, the aforementioned suitable system indicators are selected as necessary conditions using suitable system criteria as sufficient conditions according to the system conditions and in accordance with the respective restraint system design, tested with an evaluation function or functions, in the simplest case fixed limits, and acted upon (switched on/off) according to a response function or functions, in the simplest case a current-reducing measure.

An example is given:

In the case of a reduced supply voltage, a low vehicle ambient temperature does not usually lead to a critical vehicle electrical system/restraint system supply, because supply internal resistances, e.g. copper (Cu) lead resistances, usually decrease at low temperatures, as do the internal resistances RDSon of the switching transistors and the converter coils. This leads to higher efficiency.

It should be noted that the efficiencies of modern MOSFET-based DC voltage converters, in particular in the restraint system supply, increase their efficiency as temperatures decrease and as a result of decreasing resistance values (RDSon) of the MOSFETs as switching transistors and the Cu-based converter coils and thus automatically cause a decreasing current drain from the vehicle supply.

However, depending on the error pattern, attempting a high starter current drain can temporarily jeopardize the operation of electrical vehicle assemblies if they have not already been switched off by the battery management. The restraint system supplies do nonetheless cover supply situations down to very low vehicle voltages, such as 6 V.

With suitable compilation, logical/functional combination, suitable evaluation/evaluation function and adjusted response/response function, a selection of the following system indicators as necessary conditions can be used to implement a necessary current reduction of the restraint system or systems with defined side effects, and thus contribute to maintaining the function of the restraint systems in critical situations.

The vehicle electrical system restraint system supply voltage $U_B$ with a relevant evaluation range from 5.5 V to 8.5 V, for instance, for example measured with an ADC in the system base chip
and/or
the vehicle ambient temperature with a relevant evaluation range from 45° C. to 65° C., for instance, for example measured by peripheral sensors comprising an integrated temperature sensor and a communication link, such as CAN, PSI, etc., to the restraint system
and/or
the passenger compartment temperature with a relevant evaluation range from 65° C. bis 85° C., for instance, for example measured by temperature sensors of the vehicle climate control electronics with a communication link, such as FlexRay, CAN, etc., to the restraint system
and/or
the interior temperature of the restraint system control unit with a relevant evaluation range from 85° C. to 105° C., for instance, for example measured by central sensors of the control unit comprising an integrated temperature sensor and a communication link, such as SPI-BUS, to the main microcontroller and thus indirectly to the system base chip or chips of the restraint system electronics
and/or
the temperature of the integrated supply assembly in a relevant evaluation range from 115° C. to 135° C., for instance, for example measured by a suitably placed temperature sensor on the system base chip or chips
and/or
the switching converter/switching transistor temperature(s) in a relevant evaluation range from 165° C. to 185° C., for instance, for example measured by temperature sensor(s) placed close to the switching transistor(s) on the system base chip or chips
and/or
the vehicle electrical system/restraint system supply internal resistance within a relevant evaluation range from 1Ω to 2Ω, for instance, for example measured in the restraint system electronics by a $U_B$ supply voltage evaluation under known load jumps.

According to the above list, the system indicator $U_B$ is always used, along with other indicators, as a part of the selection for identifying critical supply situations of the restraint system.

If a critical supply state is identified in an otherwise error-free restraint system, e.g., on the basis of a suitable evaluation of a suitable selection of the above indicators, which are referred to as necessary conditions, a reduction of the restraint system supply current occurs in response, e.g. by activating measures to increase the efficiency of the used DC voltage switching converters.

A breakdown of the vehicle supply to the restraint system due to too high supply currents is thus counteracted.

These measures are switched or functional individually or switched or functional as a whole and can be used depending on the system configuration and affect the following parameters:

selecting the smallest switching frequency of the DC voltage converters permissible in the vehicle system, e.g., 1.875 MHz, for instance if 2.3 MHz or higher and 1.875 MHz are applied in principle and the lower frequency is not a significant limitation in this application under these extreme conditions. This can reduce switching losses by up to approximately 24%. The frequency can also be reduced in accordance with a response function.

selecting the highest gate driver currents of the switching converter transistors to achieve the highest switching speed, i.e., the smallest rise times tr and fall times tf. Switching losses can thus be reduced by about 30% to 60%, in particular with the necessary boost converters. The rise times tr and fall times tf can also be reduced according to a function.

The selection of these measures is permissible if the expected effects of the converter disturbances due to the changed operating mode are examined and the positive effect of the supply current reduction on the disturbance behavior is not raised above weighted limits by effects of the impermissible frequency shift, the slope or a too pronounced kink in the converter edge.

It is important to note that the focus is on the safety-related feature of making the restraint system available even under extreme conditions. Effects on non-safety-related systems, such as a radio, are therefore restricted in a weighted manner if necessary or at all relevant, for example if the vehicle voltage is too low and/or the temperature is too high for a commercial article (consumer product).

Sufficient conditions for activating this method can be an appropriately programmed system configuration that applies to the individual system.

Further necessary conditions as relevant indicators can be added with the appropriate system configuration. This is an additional independent temperature measurement by a central sensor, for example, which is communicated to the system base chip via a serial interface, such as SPI (serial peripheral interface), with the involvement of the main microcontroller.

A temperature measurement of the passenger compartment or the vehicle interior of the vehicle is moreover communicated to the restraint system via a vehicle BUS, such as a CAN (controller area network), and forwarded to the system base chip via the SPI interface, with the involvement of the main microcontroller. Reference is made to the above list of relevant indicators as necessary conditions.

The presented arrangement is configured to carry out a method of the type described here and is provided for this purpose in a vehicle electrical system, typically as a component of said vehicle electrical system. The arrangement can be implemented in hardware and/or software. The arrangement can also be integrated in a control unit or configured as such.

A vehicle electrical system comprising such an arrangement for carrying out the method is presented here as well.

Further advantages and embodiments of the present invention will emerge from the description and the figures.

It goes without saying that the aforementioned features and the features yet to be explained in the following can be used not only in the respectively specified combination, but also in other combinations or on their own, without leaving the scope of the present invention.

DETAILED DESCRIPTION OF EXAMPLE EMBODIMENTS

The present invention is illustrated schematically in the figures on the basis of embodiments and is described in detail in the following with reference to the figures.

Figure 1:
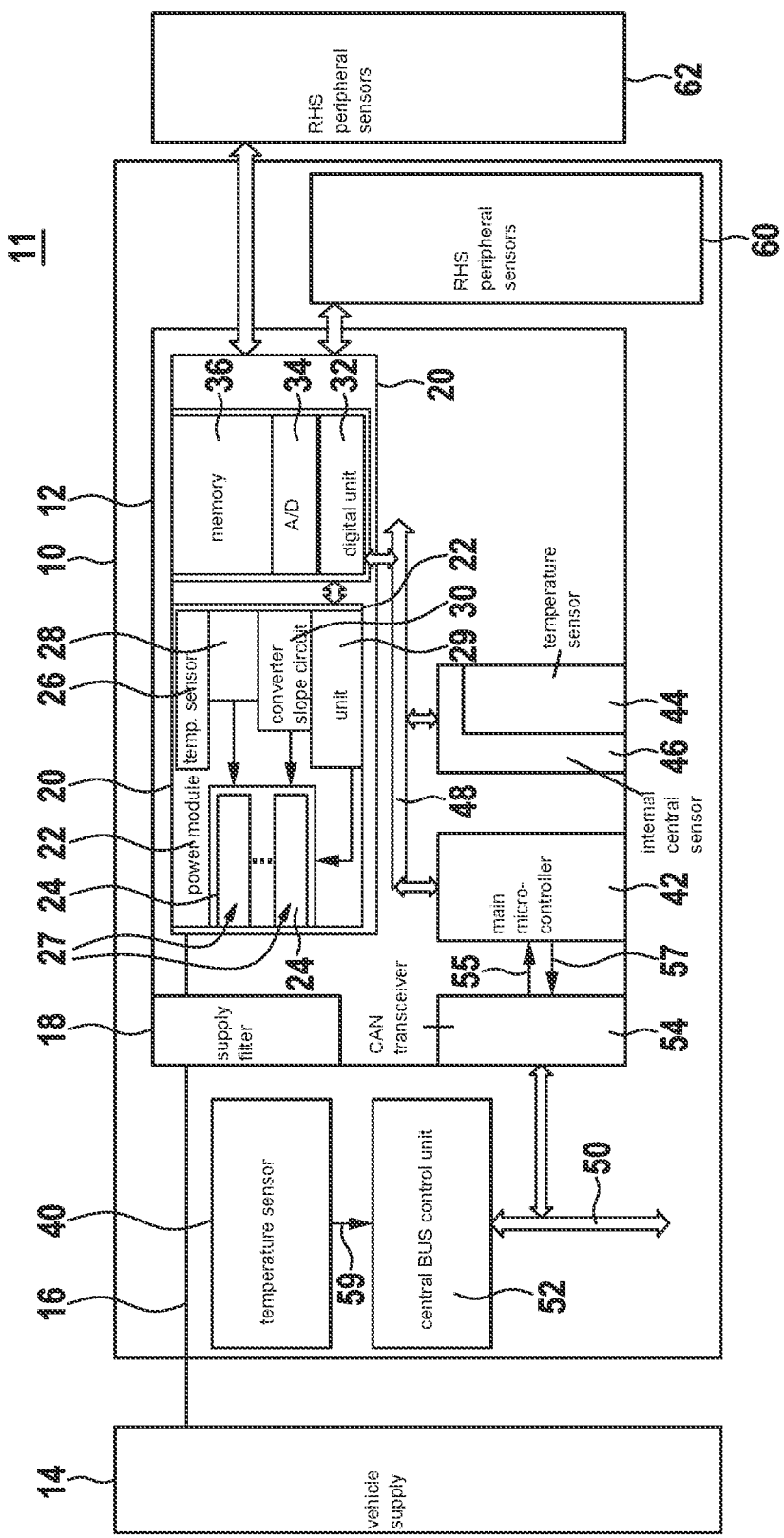
FIG. 1 shows an embodiment of the presented method in a block diagram, according to the present invention.

FIG. 1 shows a restraint system (RHS) 11 with components inside and outside a passenger compartment 10. The control unit 12 of the restraint system 11 and the connected RHS peripheral sensors and actuators 60 that can be allocated to the interior space are located in the passenger compartment 10. Further RHS peripheral sensors 62 are located outside the passenger compartment 10. All RHS peripheral sensors 60 and 62 are typically connected to the control unit 12 of the restraint system via a PSI interface. The illustration shows assemblies relevant to the presented method.

A vehicle supply 14 is configured to provide the input voltage $U_B$ 16 to the control unit 12 of the RHS 11. A system base chip (SBC) 20 is supplied via a supply filter 18 with reverse polarity protection to reduce conducted interferences on the control unit 12 and, conversely, to reduce disturbances from the control unit 12 on the vehicle supply network or the vehicle supply 14. The SBC 20 includes an integrated power module (POM) 22 with at least one DC voltage switching converter 24. Routinely, three to four DC voltage switching converters 24 are used.

The power module 22 also comprises a suitably placed temperature sensor 26 to measure the SBC chip temperature.

A switching transistor temperature 27 of the individual DC voltage switching converters 24 can optionally be measured as well. Further provided are a programmable converter clock circuit 28 to provide the programmed converter frequency to the DC voltage switching converters 24 collectively or individually, and a unit 29 for configuring and trimming the DC voltage switching converters 24. The frequency of the DC voltage switching converters 24 can be set uniformly or individually. A programmable converter-slope circuit 30 is provided too, which collectively or individually specifies the appropriate manipulation of the driver circuits in the various DC voltage switching converters 24 in order to achieve a specific collective or individual switching speed characterized by the rise time tr and fall time tf of the actuated power transistors in the DC voltage switching converters 24.

The SBC 20 further comprises a digital unit 32 for controlling, monitoring, regulating and/or exchanging data for all SBC modules, wherein this is not an exhaustive list. The SBC 20 in particular comprises an analog-to-digital unit 34 to transform values from the analog plane to the digital plane and vice versa. Analog-to-digital converters (ADC), comparators and digital-to-analog converters (DAC) are provided for this purpose.

In this context, the acquisition of the SBC internal temperature and the SBC supply voltage level, i.e., the boost converter input voltage VZP and/or $U_B$, by the analog-to-digital unit 34 is a minimum of indicators as necessary conditions to be able to identify a critical supply state of the RHS 11 with a suitable evaluation. This is derived from the coincidence of low vehicle supply at the highest ambient temperatures, which is indicative of a defective supply system. The objective here is to prioritize the safety-related functions and, provided the use or application permits this, load consumer-relevant products, such as a radio, with a defined higher noise or interference level, if necessary.

The SBC 20 further comprises a programmable non-volatile memory 36, for example in the form of OTP (one time programmable), EEPROMS, data flash, etc. This memory 36 is used for POM configuration, in particular with respect to the trim values.

Therefore, with suitable programming, the memory 36 is used in the RHS 11 for the application-specific selection of the relevant indicators as necessary conditions, the selection of the evaluation function of these indicators, e.g. limits, for identifying a critical supply state, the selection of the response function, e.g. switchable or functional interventions, for reducing the RHS input current, e.g., by increasing the efficiency of the switching converters and for the general approval of this method for this product as a sufficient condition. Since the input current from $U_B$ increases with decreasing voltage when switching converters are used with the same control unit internal supply power, in the event of critical supply states, which are triggered primarily by faults in the vehicle supply under extreme climatic conditions, measures have to be taken which counteract the increase of the input current into the RHS control unit 12 in order to stop the further internal resistance-driven drop in $U_B$ and also to counteract a further SBC chip temperature increase which likewise degrades the efficiency of the DC voltage switching converters 24 and thus increases the power consumption. According to the general requirement for the RHS electronics, the safety-related RHS function is lost if $U_B$ falls below a minimum value, e.g. $U_{Bmin}$=5.5 V to 6 V, or the SBC chip exceeds a maximum SBC chip temperature of 150° C. to 175° C., for instance.

As effective measures, the maximum possible reduction of the switching converter frequency or frequencies and increasing the switching speed of the transistors of the DC voltage switching converters 24 to the maximum possible speed and speeds are a suitable solution.

It is optionally also possible to omit, i.e., switch off, functions that are not absolutely necessary in order to reduce the supply current.

The data processing of the defined indicators for identifying a critical vehicle electrical system/restraint system supply can optionally also take place entirely or partially in the main microcontroller 42, as the required data can also be provided to the main microcontroller 42 via the SPI 48.

Some or all of the functions of the memory 36 can be taken over as well.

For further optimization and thus even more selective identification of a critical supply state of the RHS 11, a temperature sensor 40 of the vehicle interior (passenger compartment) can additionally or optionally be added as an indicator (necessary condition). Its value is made available to the RHS control unit 12 via known vehicle bus systems 50, such as CAN, and can be made available to the SBC 20, evaluated or not evaluated, by the main microcontroller 42. A central BUS control unit 52 is also used for this purpose, which communicates bidirectionally with the main microcontroller 42 via a CAN transceiver 54, i.e., RxD 55 and TxD 57, and receives analog and/or digital data (arrow 59) from the temperature sensor 40.

The temperature of the passenger compartment can additionally or optionally also be measured via a temperature sensor in the peripheral RHS sensor 60.

A temperature sensor 44 of a control unit internal central sensor 46 can additionally or optionally be added as an indicator as a necessary condition. Its value is acquired by the main microcontroller 42 via the SPI control unit BUS 48 and can be made available to the SBC 20 by the main microcontroller 42, evaluated or not evaluated. One advantage of this is that, due to the extremely low self-heating of the central sensor 46, an accurate measurement of the control unit interior temperature is possible.

The temperature sensors 26 of the switching transistors of the DC voltage switching converters 24 of the SBC 20 can additionally or optionally be added as indicators of a critical vehicle electrical system/RHS supply as a necessary condition. The inertialess, in particular fast identification of overloads is advantageous.

The internal resistance of the RHS supply can additionally or optionally be determined as an indicator as a necessary condition by measuring the voltage $U_B$ 16 before and during a known switched RHS load current increase, e.g. 100 mA energy reserve charge current on/off through the power module 22.

The stated measures can also be taken alone, in particular while monitoring the main microcontroller 42. Said microcontroller knows the application and all relevant measured values (indicators=necessary conditions), such as $U_B$, VZP, temperature of the SBC, temperature of control unit 12 inside (central sensor 46), passenger compartment, temperature 27 of the switching transistors, temperature of the vehicle exterior, internal resistance of the RHS supply, which can identify a critical supply state of the RHS system, and knows whether the vehicle is stationary, e.g. with the radio switched on and the ignition on, at v=0 or in motion at v≠0.

Figure 2:
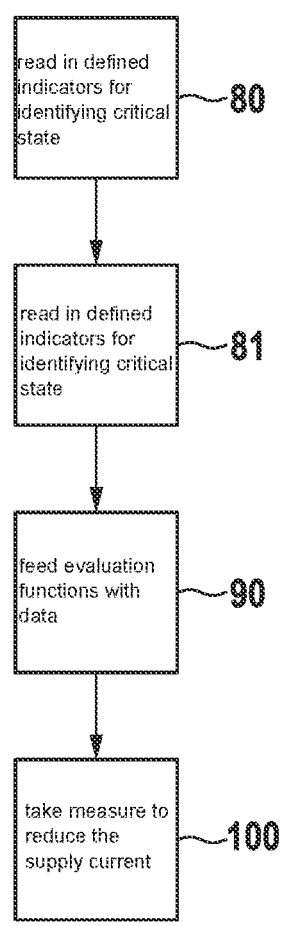
FIG. 2 shows a possible sequence for the presented method in a flow chart, according to the present invention.

FIG. 2 shows a highly simplified flow chart of a possible embodiment of the described method.

In steps 80 and 81, all defined indicators for identifying a critical supply state of the RHS are read in.

In a second step 90, all evaluation functions are fed with the data. If the evaluation functions identify a critical supply state of the RHS, the appropriate measure is taken, in the final step 100 to sufficiently reduce the supply current in accordance with the result of step 90 (criticality).

What is claimed is:

1. A method for operating a vehicle electrical system that is provided for supplying at least one restraint system, the method comprising:
    monitoring a voltage of the vehicle electrical system as an indicator and monitoring at least one further indicator;
    detecting a critical supply state of the restraint system by evaluating the indicator and the further indicator; and
    reducing an efficiency of used DC voltage switching converters by at least one measure, so that a supply current for the at least one restraint system is reduced by the at least one restraint system;
    wherein a release condition is requested prior to implementing the at least one measure.

2. The method according to claim 1, wherein a chip temperature of a system base chip is monitored as the further indicator.

3. The method according to claim 1, wherein the indicator and the further indicator are evaluated by at least using threshold values.

4. The method according to claim 1, wherein non-safety-related functions are switched off as a measure of the at least one measure.

5. The method according to claim 1, wherein a vehicle electrical system voltage of the vehicle electrical system and a temperature of a system base chip are monitored.

6. The method according to claim 4, wherein the method is carried out with a vehicle electrical system voltage reduced to a range from 5.5 V to 8.5 V and a temperature of the system base chip in a range from 115° C. to 150° C.

7. The method according to claim 1, wherein different restraint system temperatures selected from the following group are taken into account as indicators: vehicle exterior, vehicle interior, switching converter transistor temperature of the DC voltage switching converters, battery temperature.

8. The method according to claim 1, wherein an internal resistance of a supply of the restraint system is taken into account as an additional indicator.

9. The method according to claim 1, wherein the method is carried out based on different situations, wherein the situations are selected from a group including: cell short circuiting, deeply discharged vehicle starter battery, high current drain by other vehicle systems, high ambient temperatures, high battery temperature, vehicle speed, engine on/off.

10. The method according to claim 1, wherein the measure is selected from a group including: selection of the switching frequency to a lowest permissible, selection of the gate driver currents of transistors of DC voltage switching converters to a highest, reduction down to all non-safety-related functions of the restraint system.

11. An arrangement for operating a restraint system, the arrangement configured to:
monitor a voltage of the vehicle electrical system as an indicator and monitoring at least one further indicator;
detect a critical supply state of the restraint system by evaluating the indicator and the further indicator; and
reduce an efficiency of used DC voltage switching converters by at least one measure, so that a supply current for the at least one restraint system is reduced by the at least one restraint system;
wherein a release condition is requested prior to implementing the at least one measure.

12. The arrangement according to claim 11, wherein the arrangement is configured as a control unit of a motor vehicle.

* * * * *